United States Patent
Baqai et al.

(10) Patent No.: US 7,277,575 B2
(45) Date of Patent: Oct. 2, 2007

(54) SYSTEM AND METHOD FOR EFFECTIVELY PERFORMING AN IMAGE DATA TRANSFORMATION PROCEDURE

(75) Inventors: Farhan A. Baqai, Fremont, CA (US); Ted J. Cooper, Sunnyvale, CA (US); Akira Matsui, Kanagawa (JP); Kenichi Nishio, Yokohama (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 467 days.

(21) Appl. No.: 10/721,628

(22) Filed: Nov. 25, 2003

(65) Prior Publication Data

US 2005/0110876 A1 May 26, 2005

(51) Int. Cl.
*G06K 9/00* (2006.01)
*H04N 5/228* (2006.01)

(52) U.S. Cl. .................... 382/162; 348/222.1
(58) Field of Classification Search ............ None
See application file for complete search history.

(56) References Cited

U.S. PATENT DOCUMENTS

| | | | | |
|---|---|---|---|---|
| 5,805,213 A | * | 9/1998 | Spaulding et al. | 348/222.1 |
| 5,850,472 A | * | 12/1998 | Alston et al. | 382/162 |
| 6,049,626 A | * | 4/2000 | Kim | 382/167 |
| 6,151,136 A | | 11/2000 | Takemoto | 358/1.9 |
| 6,459,425 B1 | * | 10/2002 | Holub et al. | 345/207 |
| 6,505,002 B2 | * | 1/2003 | Fields | 396/287 |

\* cited by examiner

*Primary Examiner*—Wenpeng Chen
(74) *Attorney, Agent, or Firm*—Gregory J. Koerner; Redwood Patent Law

(57) ABSTRACT

A system and method for effectively performing an image data transformation procedure may include an electronic camera device that is implemented to capture primary image data corresponding to a photographic target. A transformation manager in the electronic camera device may be configured to convert the primary image data into secondary image data by utilizing selectable transformation parameters that are optimized by utilizing an optimization metric to thereby minimize noise characteristics in the secondary image data. The transformation parameters may be stored in parameter lookup tables in the electronic camera device for use by the transformation manager in performing the image data transformation procedure.

8 Claims, 7 Drawing Sheets

Transformation Matrix 310

|  | Parameter k1 | Parameter k2 | Parameter k3 |
|---|---|---|---|
| Illuminant A | k1 Value | k2 Value | k3 Value |
| Illuminant B | k1 Value | k2 Value | k3 Value |
| Illuminant C | k1 Value | k2 Value | k3 Value |
| Illuminant D | k1 Value | k2 Value | k3 Value |
| Illuminant E | k1 Value | k2 Value | k3 Value |

Parameter Look Up Table: 510

Fig. 5

Camera Gain = 1

SYSTEM AND METHOD FOR EFFECTIVELY PERFORMING AN IMAGE DATA TRANSFORMATION PROCEDURE

BACKGROUND SECTION

1. Field of the Invention

This invention relates generally to techniques for manipulating data, and relates more particularly to a system and method for effectively performing an image data transformation procedure.

2. Description of the Background Art

Implementing efficient methods for manipulating data is a significant consideration for designers and manufacturers of contemporary electronic devices. However, effectively manipulating data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that efficiently captures and manipulates digital image data may benefit from an efficient implementation because of the large amount and complexity of the digital data involved.

In certain electronic cameras that capture digital image data, various transformation procedures to alter the format of the image data may be required. Due to growing demands on system resources and substantially increasing data magnitudes, it is apparent that developing new techniques for manipulating data is a matter of concern for related electronic technologies. Therefore, for all the foregoing reasons, developing efficient systems for manipulating data remains a significant consideration for designers, manufacturers, and users of contemporary electronic devices.

SUMMARY

In accordance with the present invention, a system and method are disclosed for effectively performing an image data transformation procedure. In one embodiment, during an offline design procedure, transformation parameter limits may be defined to specify desired ranges for optimized transformation parameters to perform the foregoing image data transformation procedure. In addition, an optimization metric may be defined for evaluating a representative patch set of color patches for noise characteristics under various conditions.

Then, a current illuminant of the representative patch set may be measured and recorded. Next, each of the color patches from the representative patch set may be measured to determine various desired color and brightness characteristics. In accordance with the present invention, the optimized transformation parameters may be carefully selected to minimize the optimization metric which thereby minimizes the amount of noise in the corresponding image data. The foregoing process may be repeated to select additional optimized transformation parameters for each desired illuminant at various camera gains. Finally, when optimized transformation parameters have been selected for each illuminant and camera gain, then parameter lookup tables may be created to store the optimized transformation parameters in the electronic camera device.

In an online procedure, an appropriate camera gain may initially be determined and stored by the electronic camera device, depending upon current lighting conditions of a desired photographic target. Then, the electronic camera device may estimate and store a current illuminant of the photographic target. A transformation manager of the electronic camera device may access one or more of the foregoing parameter lookup tables containing optimized transformation parameters for performing the image data transformation procedure.

In certain embodiments, the transformation manager may utilize the parameter lookup tables to interpolate optimized transformation parameters that are closest to the current camera gain and current illuminant of the photographic target. Next, the transformation manager may load camera registers of the electronic camera device with the appropriate optimized transformation parameters, and may utilize the optimized transformation parameters to perform one or more image data transformation procedures, in accordance with the present invention. The present invention thus provides an improved system and method for effectively performing an image data transformation procedure.

BRIEF DESCRIPTION OF THE DRAWINGS

FIG. 5 is a diagram for one embodiment of a parameter lookup table, in accordance with the present invention;

DETAILED DESCRIPTION

The present invention relates to an improvement in data manipulation techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively performing an image data transformation procedure, and may include an electronic camera device that is implemented to capture primary image data corresponding to a photographic target. A transformation manager in the electronic camera device may be configured to convert the primary image data into secondary image data by utilizing selectable transformation parameters that are optimized by utilizing an optimization metric to thereby minimize noise characteristics in the secondary image data. The transformation parameters may be stored in parameter lookup tables in the electronic camera device for use by the transformation manager in performing the image data transformation procedure.

Figure 1:
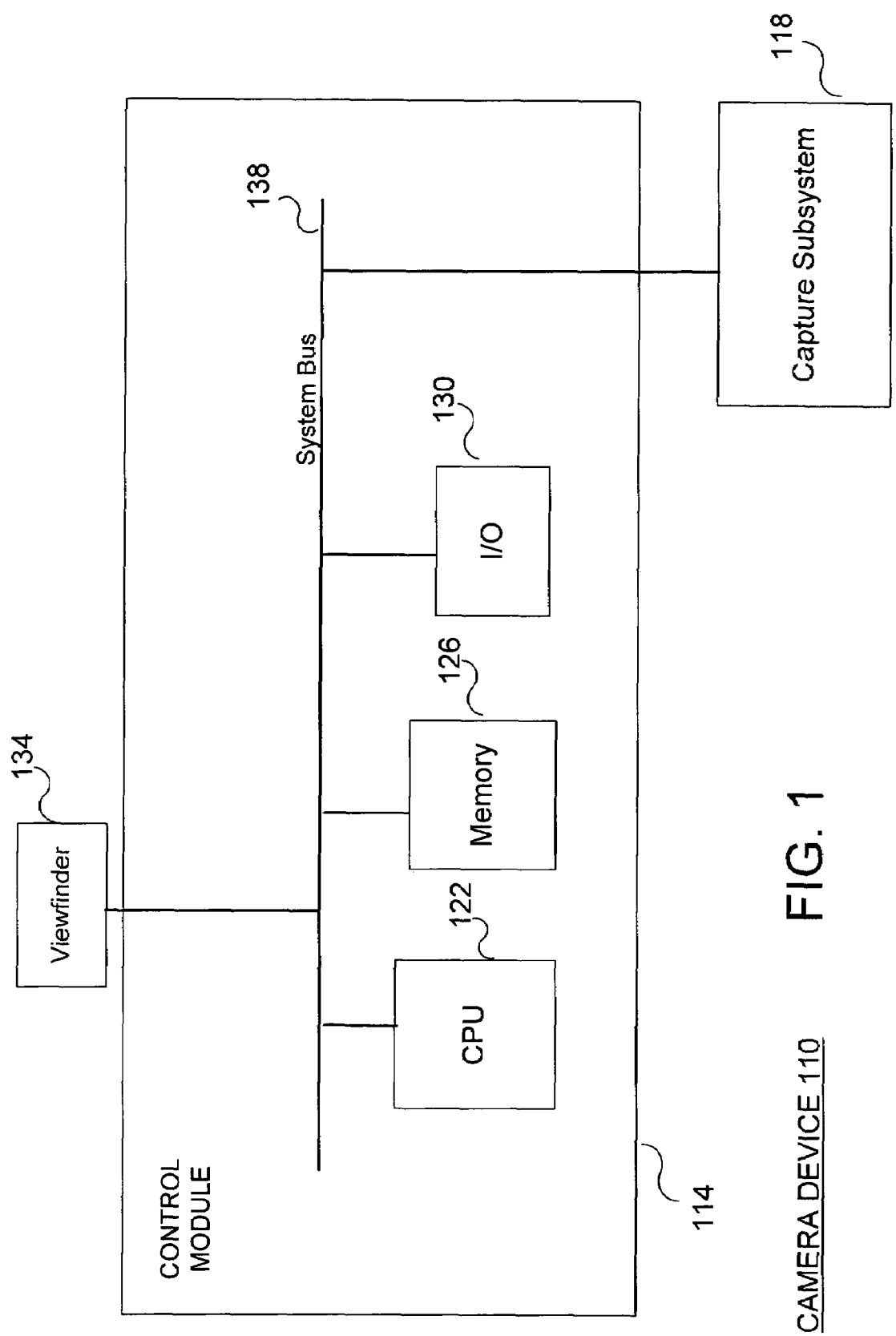
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 118, a system bus 138, and a control module 114. In the FIG. 1 embodiment, capture subsystem 118 may be optically coupled to a target object, and may also be electrically coupled via system bus 138 to control module 114.

Figure 4:
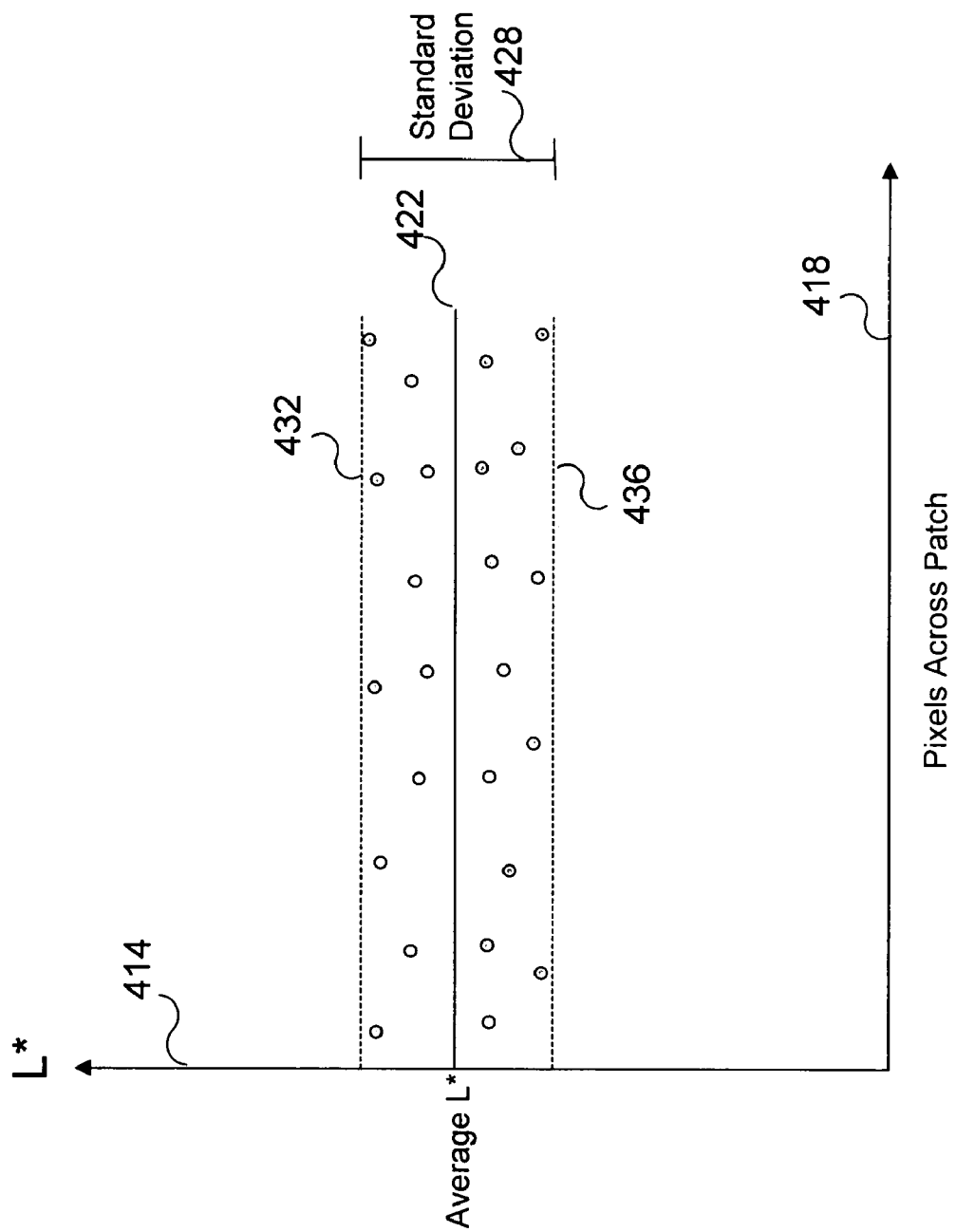
FIG. 4 is a graph illustrating one embodiment for determining a standard noise deviation, in accordance with the present invention.

In alternate embodiments, camera device 110 may readily include various other components in addition to, or instead of, those components discussed in conjunction with the FIG. 4 embodiment. In addition, in certain embodiments, the present invention may alternately be embodied in any appropriate type of electronic device other than the camera device 110 of FIG. 1. For example, camera device 110 may readily be implemented as a scanner device or a video camera device.

In the FIG. 1 embodiment, once a system user has focused capture subsystem 118 on a target object and requested camera device 110 to capture image data corresponding to the target object, then control module 114 may preferably instruct capture subsystem 118 via system bus 138 to capture image data representing the target object. The captured image data may then be transferred over system bus 138 to control module 114, which may responsively perform various processes and functions with the image data. System bus 138 may also bi-directionally pass various status and control signals between capture subsystem 118 and control module 114.

In certain embodiments, camera device 110 may include illuminant estimation means for determining an illuminant of the current target object. For example, camera device 110 may estimate a current illuminant to be any appropriate lighting source, such as a particular color temperature of daylight, fluorescent light, or incandescent light. In addition, camera device 110 may include camera gain adjustment means for varying a camera gain of camera device 110 to compensate for brightness conditions on the current target object. For example, camera device 110 may increase the camera gain to compensate for dark lighting conditions of the target object, and may also decrease the camera gain to compensate for bright lighting conditions of the target object.

In the FIG. 1 embodiment, capture subsystem 118 may include, but is not limited to, an image sensor that captures image data corresponding to the target object via reflected light impacting the image sensor along an optical path. The image sensor, which may preferably include a charge-coupled device (CCD), may responsively generate a set of image data representing the target object. The image data may then be routed over system bus 138 to control module 114 for appropriate processing and storage. Other types of image capture sensors, such as CMOS or linear arrays are also contemplated for capturing image data in conjunction with the present invention. For example, the image capture sensors may include three or more primary color channels (for example, Red/Green/Blue (RGB), or Cyan/Magenta/Yellow/Green (C/M/Y/G) may be contemplated).

In the FIG. 1 embodiment, control module 114 preferably includes, but is not limited to, a viewfinder 134, a central processing unit (CPU) 122, a memory 126, and one or more input/output interface(s) (I/O) 130. Viewfinder 134, CPU 122, memory 126, and I/O 130 preferably are each coupled to, and communicate, via common system bus 138 that also communicates with capture subsystem 118. In alternate embodiments, control module 114 may readily include various other components in addition to, or instead of, those components discussed in conjunction with the FIG. 1 embodiment.

In the FIG. 1 embodiment, CPU 122 may preferably be implemented to include any appropriate microprocessor device. Alternately, CPU 122 may be implemented using any other appropriate technology. For example, CPU 122 may be implemented to include certain application-specific integrated circuits (ASICs) or other appropriate electronic devices. Memory 126 may preferably be implemented as one or more appropriate storage devices, including, but not limited to, read-only memory, random-access memory, and various types of non-volatile memory, such as floppy disc devices, hard disc devices, or flash memory. I/O 130 preferably may provide one or more effective interfaces for facilitating bi-directional communications between camera device 110 and any external entity, including a system user or another electronic device. I/O 130 may be implemented using any appropriate input and/or output devices. The functionality and utilization of camera device 110 is further discussed below in conjunction with FIGS. 2-7.

Figure 2:
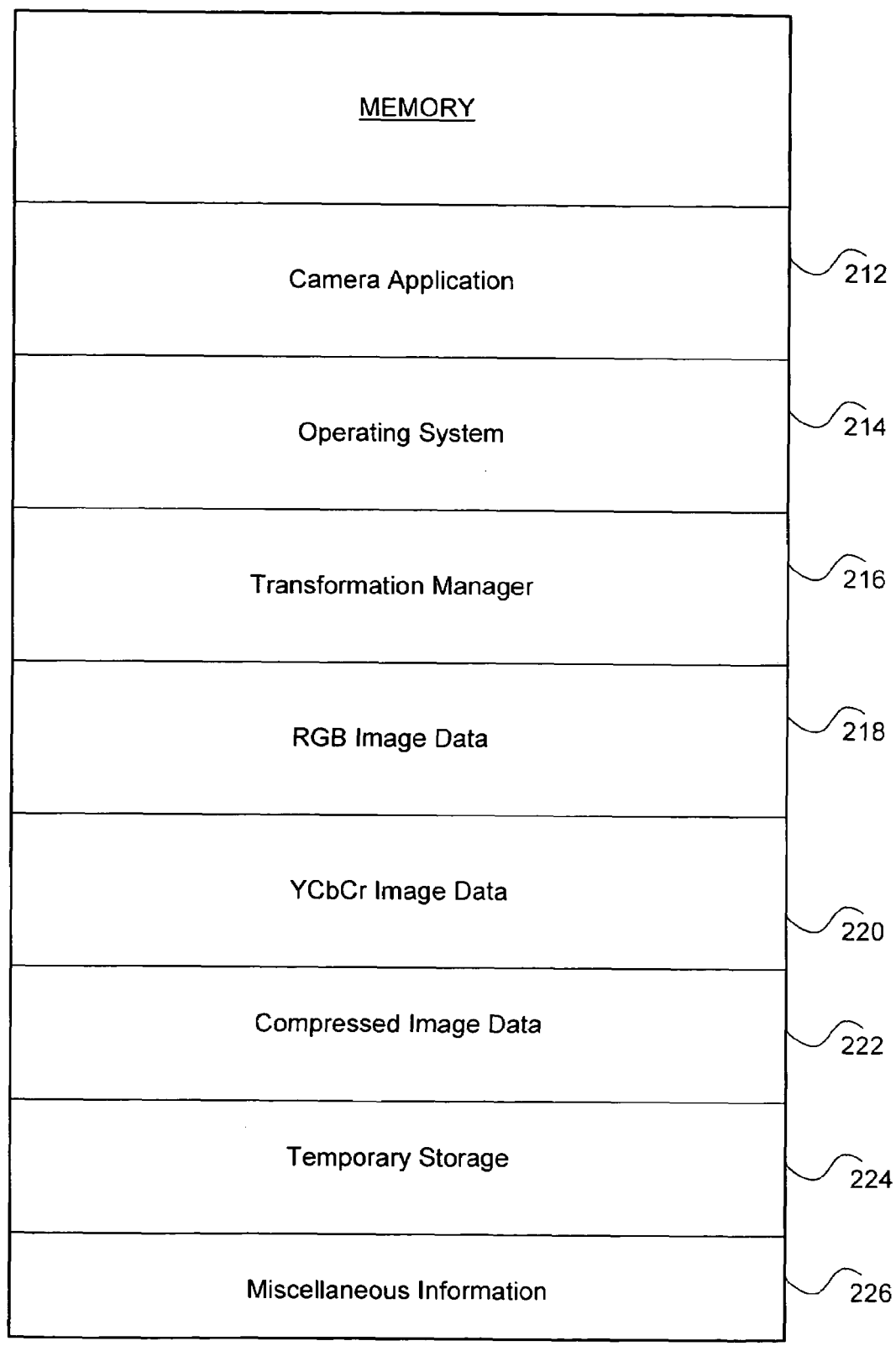
FIG. 2 is a block diagram for one embodiment of the memory of FIG. 1, in accordance with the present invention.

Referring now to FIG. 2, a block diagram for one embodiment of the FIG. 1 memory 126 is shown, in accordance with the present invention. In the FIG. 2 embodiment, memory 126 may preferably include, but is not limited to, a camera application 212, an operating system 214, a transformation manager 216, RGB image data 218, YCbCr image data 220, compressed image data 222, temporary storage 224, and miscellaneous information 226. In alternate embodiments, memory 126 may readily include various other components in addition to, or instead of, those components discussed in conjunction with the FIG. 2 embodiment.

In the FIG. 2 embodiment, camera application 212 may include program instructions that are preferably executed by CPU 122 (FIG. 1) to perform various functions and operations for camera device 110. The particular nature and functionality of camera application 212 preferably varies depending upon factors such as the type and particular use of the corresponding camera device 110.

In the FIG. 2 embodiment, operating system 214 preferably controls and coordinates low-level functionality of camera device 110. In accordance with the present invention, transformation manager 216 may preferably control and coordinate one or more image data transformation procedures for image data captured by camera device 110. The functionality of transformation manager 216 is further discussed below in conjunction with FIGS. 3-7.

In the FIG. 2 embodiment, RGB image data 218, YCbCr image data 220, and compressed image data 222 may include various formats of image data originally captured by camera device 110. Temporary storage 224 may provide storage locations on a temporary basis for any appropriate type of information or data. Miscellaneous information 226 may include any desired software instructions, data, or other information for facilitating various functions performed by camera device 110.

Figure 3:
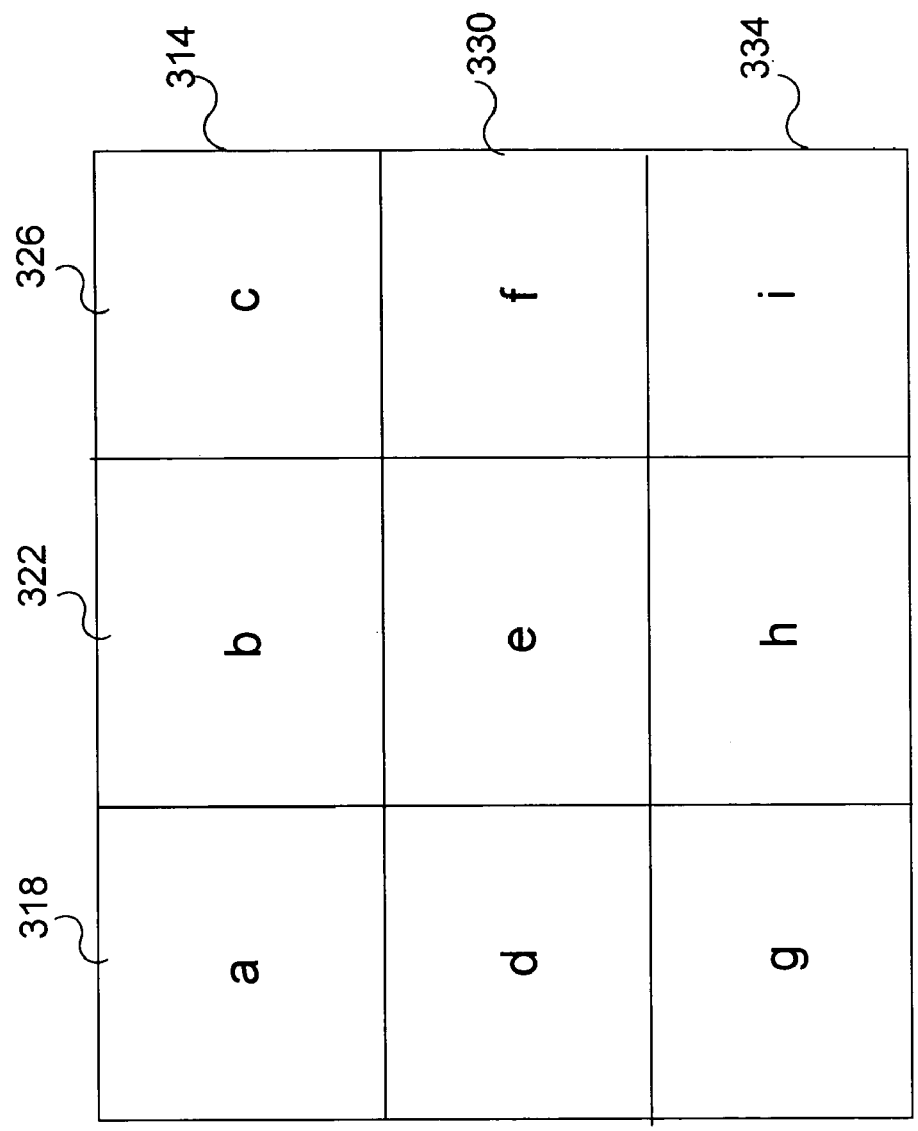
FIG. 3 is a diagram for one embodiment of a transformation matrix, in accordance with the present invention.

Referring now to FIG. 3, a diagram for one embodiment of a transformation matrix 310 is shown, in accordance with the present invention. In alternate embodiments of the present invention, transformation manager 216 may readily utilize various techniques that are different from those discussed in conjunction with the FIG. 3 embodiment.

In accordance with the present invention, transformation manager 216 (FIG. 2) or another appropriate entity may utilize transformation parameters from transformation matrix 310 to convert RGB image data 218 (or other appropriate primary color image data) into corresponding YCbCr image data 220. In certain embodiments of the present invention, transformation manager 216 may similarly utilize transformation matrix 310 to convert primary color image data into appropriate formats other than YCbCr image data 220.

In the FIG. 3 embodiment, transformation matrix 310 may include a first row 314 of luminance transformation parameters, a second row 330 of Cb transformation parameters, and a third row 334 of Cr transformation parameters. In the FIG. 3 embodiment, the foregoing first row 314 of luminance transformation parameters may include a first luminance transformation parameter "a" (318), a second luminance transformation parameter "b" (322), and a third luminance transformation parameter "c" (326).

In certain embodiments, transformation matrix 310 may utilize transformation matrix 310 to perform an image data transformation procedure to convert RGB image data 218 into YCbCr image data 220 to thereby facilitate a subsequent conversion of the YCbCr image data 220 into an appropriate type of compressed image data 222, such as MPEG image data. The YCbCr format is a standard color space that is utilized the television industry. In the FIG. 3 embodiment, the foregoing image data transformation procedure may utilize conventional transformation parameters from a well-known "Recommendation 601" standard for calculating "Cb" with the second row 330 of Cb transformation parameters. Recommendation 601 is more formally known as Recommendation ITU-R (formerly CCIR) BT.601-4, "Encoding Parameters Of Digital Television For Studios" (Geneva: ITU, 1990). Similarly, the foregoing image data transformation procedure may utilize conventional transformation parameters from the known "Recommendation 601" standard for calculating "Cr" with the third row 330 of Cr transformation parameters.

Utilizing transformation parameters from the "Recommendation 610" standard, "Cb" may therefore be described by the following formula:

$$Cb = dR + eG + fB$$

where "R, G, and B" are color primary values from RGB image data 218, and "d, e, and f" are transformation parameters from the second row 330 of Cb transformation parameters from transformation matrix 310.

Similarly, utilizing transformation parameters from the "Recommendation 610" standard, "Cr" may therefore be described by the following formula:

$$Cr = gR + hG + iB$$

where "R, G, and B" are color primary values from RGB image data 218, and "g, h, and i" are transformation parameters from the third row 334 of Cr transformation parameters from transformation matrix 310.

In accordance with the present invention, transformation manager 216 may also advantageously select transformation parameters 318, 322, and 326 to calculate a first luminance value "Y1" according to the following formula:

$$Y1 = aR + bG + cB$$

where "R, G, and B" are color primary values from RGB image data 218, and "a, b, and c" are transformation parameters from the first row 314 of luminance transformation parameters of transformation matrix 310.

In the FIG. 3 embodiment, the first row 314 of luminance transformation parameters may also be expressed alternately to represent the luminance transformation parameters. For example, the first luminance transformation parameter "a" (318) may alternately be expressed as "k1", and the second luminance transformation parameter "b" (322) may be expressed as "k2". In accordance with the present invention, the third luminance transformation parameter "c" (326) may thus be defined by the following formula:

$$c = 1 - k1 - k2$$

where "k1" is the first luminance transformation parameter 318, and "k2" is the second luminance transformation parameter 322.

Transformation manager 216 may therefore select transformation parameters 318 and 322 to calculate a first luminance value "Y1" according to the following formula:

$$Y1 = (k1)R + (k2)G + (1 - k1 - k2)B$$

where "R, G, and B" are color primary values from RGB image data 218, and "k1" and "k2" are selected transformation parameters from the first row 314 of luminance transformation parameters from transformation matrix 310.

The present invention may also utilize a second luminance value "Y2" that may be combined with the foregoing first luminance value "Y1" in accordance with a combination transformation parameter "k3" to thereby produce a final luminance value "Y" for the YCbCr image data 220. The second luminance value "Y2" may be a relatively unprocessed luminance value that may be determined in various appropriate manners. For example, the second luminance value "Y2" may simply be a sum or an average of selected primary color values from the initially captured image data (for example, RGB image data or CMYG image data.

In accordance with certain embodiments of the present invention, transformation manager 216 may calculate the foregoing final luminance value "Y" by selectively choosing the combination transformation parameter "k3" and applying the following formula:

$$Y = (k3)Y1 + (1 - k3)Y2$$

where "Y1" is the first luminance value calculated using transformation matrix 310, and "Y2" is the foregoing second luminance value.

In certain embodiments, the present invention may place certain transformation parameter limits upon the foregoing transformation parameters. For example, "k1" may be limited according to the following formula: $0 \leq k1 \leq 1$. Similarly, "k2" may be limited according to the following formula: $0 \leq k2 \leq 1$. In addition, third luminance transformation parameter "c" (326) may be limited according the following formula: $0 \leq (1 - k1 - k2) \leq 1$, where the third luminance transformation parameter "c" (326) equals (1−k1−k2). The foregoing combination transformation parameter "k3" may be limited according to the following formula: $0 \leq k3 \leq 2$.

In accordance with the present invention, the luminance transformation parameters of "k1", "k2", and "k3" may advantageously be optimally selected to minimize various types of noise characteristics in the YCbCr image data 220 (and consequently in the corresponding final displayed images). In certain embodiments, the luminance transformation parameters of "k1", "k2", and "k3" may also be selected to minimize various types of color shift characteristics in the YCbCr image data 220. The derivation and utilization of the foregoing transformation parameters is further discussed below in conjunction with FIGS. 4-7.

Referring now to FIG. 4, a graph 410 illustrating one embodiment for determining a standard noise deviation is shown, in accordance with the present invention. In alternate embodiments, the present invention may readily utilize various techniques that are different from those discussed in conjunction with the FIG. 4 embodiment.

As discussed above, the luminance transformation parameters of "k1", "k2", and "k3" may advantageously be optimally selected to minimize various types of noise characteristics in the YCbCr image data 220. In order to optimize the luminance transformation parameters of "k1", "k2", and "k3", an optimization metric must be derived to evaluate noise characteristics in the YCbCr image data 220. The present invention may utilize any appropriate and effective techniques to derive one or more optimization metrics.

In certain embodiments, an optimization metric may be derived by utilizing a patch set of representative color patches. For example, a standard MacBeth Color Checker chart of twenty-four different representative color patches may be utilized to derive an effective optimization metric. Each color patch from the patch set may be measured for a given camera gain, illuminant, and transformation parameters "k1", "k2", and "k3". A noise variance value may then be calculated for each color patch in an appropriate color space (such as a standard L*a*b* color space). The foregoing optimization metric may then be calculated to be the average of all of the foregoing noise variance values for each of the color patches.

In the FIG. 4 embodiment, graph 410 shows L* values from the L*a*b* color space on vertical axis 414, and shows pixels across a given color patch on horizontal axis 418. Graph 410 also shows an average L* value 422. In certain embodiments, the color patches may initially be measured in a nonlinear YCbCr format which may then be converted into a linear L*a*b* format for deriving the optimization metric. In the FIG. 4 embodiment, a standard noise deviation 428 of noise around average L* value 422 is shown as being bounded by line 432 above average L* value 422, and by line 436 below average L* value 422.

Standard noise deviation 428 may thus be determined by measuring noise values above and below average L* value 422. In accordance with the FIG. 4 embodiment, a noise variance value corresponding to the current color patch may then be obtained by squaring the standard noise deviation 428 according to the following formula:

$$NV=(SND)^2$$

where SND is the standard noise deviation 428, and NV is one of the noise variance values used to calculate the optimization metric.

After noise variance values "NV" are obtained for each color patch, an optimization metric "Φ" may be calculated by taking the average of the noise variance values for each color patch according to the formula:

$$\Phi(gain, illuminant, k1, k2, k3)=(NV_1+NV_2+NV_3+\ldots NV_M)/M$$

where "M" is the number of color patches in the patch set, and "Φ(gain, illuminant, k1, k2, k3)" is the optimization metric for particular camera gain, illuminant, and selection of transformation parameters "k1", "k2", "k3". In certain embodiments, an optimization metric may also include information from other measured values from the color patches. For example, an optimization metric may include information from a* values and/or b* values from the L*a*b* color space.

In accordance with the present invention, the foregoing optimization metric may be utilized to optimize the selection of transformation parameters "k1", "k2", "k3" to advantageously minimize noise characteristics in YCbCr image data 220. More specifically, a minimum value of the optimization metric may be sought by altering transformation parameters "k1", "k2", "k3" for various camera gains and illuminants. The foregoing minimum value of the optimization metric may be determined in any effective manner. For example, a simple trial-and-error approach may be utilized, or a more intelligent "path of steepest descent" technique may be iteratively applied to locate the minimum value for the optimization metric.

Once optimized transformation parameters "k1", "k2", "k3" are determined for various illuminants with a particular camera gain, then a parameter lookup table may be implemented for accessing or interpolating appropriate optimized transformation parameters "k1", "k2", "k3" for use in performing an image data transformation procedure by camera device 110. One implementation of a parameter lookup table is discussed below in conjunction with FIG. 5.

Referring now to FIG. 5, a diagram for one embodiment of a parameter lookup table 510 is shown, in accordance with the present invention. The parameter lookup table 510 of FIG. 5 is presented for purposes of illustration, and in alternate embodiments of the present invention, parameter lookup table 510 may readily include other elements and components in various configurations that are different from that discussed in conjunction with the FIG. 5 embodiment.

In the FIG. 5 example, a first column 534 shows a series of k1 values for various illuminants A through E that are shown in corresponding rows 514 through 530. Similarly, a second column 538 shows a series of k2 values for illuminants A through E in rows 514 through 530. A third column 542 also shows a series of k3 values for illuminants A through E in rows 514 through 530. For purposes of illustration, the FIG. 5 parameter lookup table 510 shows only five illuminants. However, in alternate embodiments, any desired number or types of illuminants may be included.

The FIG. 5 lookup table 510 provides optimized transformation parameters for a camera gain of one (unity). In accordance with the present invention, additional parameter lookup tables 510 may readily be implemented for any desired number of other camera gains. In addition, for purposes of conserving valuable memory resources in camera device 110, parameter lookup tables 510 may advantageously be implemented in a minimized format that includes a relatively smaller number of entries.

In accordance with the present invention, transformation manager 216 may then utilize various effective interpolation techniques to interpolate additional optimized transformation parameters for gains or illuminants that are not specifically listed in lookup tables 510. In addition, transformation manager 216 may also derive additional optimized transformation parameters by utilizing one or more mathematical formulas or algorithms that describe characteristics or relationships of the transformation parameters in lookup tables 510.

Figure 6:
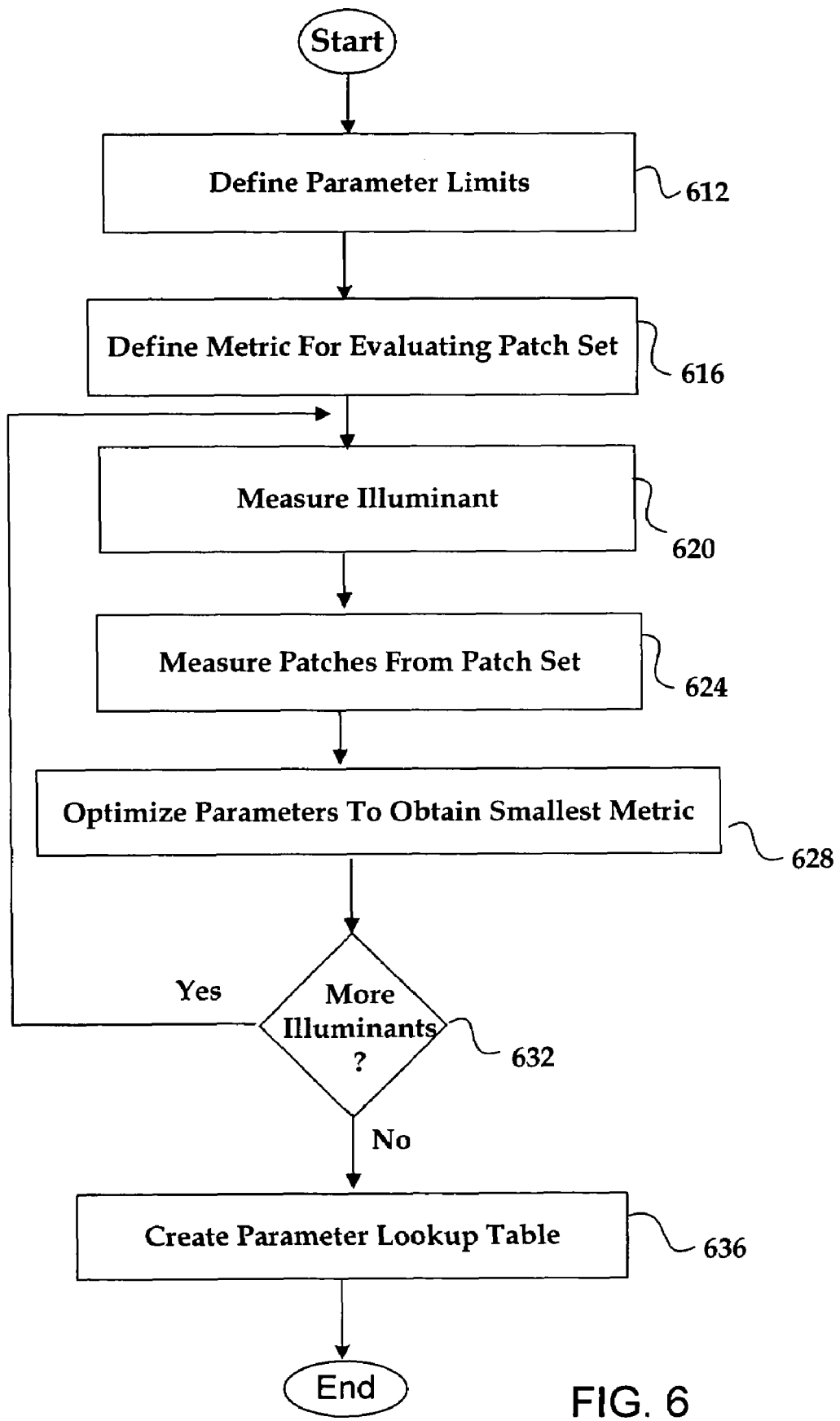
FIG. 6 is a flowchart of method steps for performing an off-line procedure for determining optimized transformation parameters, in accordance with one embodiment of the present invention.

Referring now to FIG. 6, a flowchart of method steps for performing an off-line design procedure to determine optimized transformation parameters is shown, in accordance with one embodiment of the present invention. The FIG. 6 embodiment is presented for purposes of illustration, and in alternate embodiments, the present invention may readily utilize various other steps and sequences than those discussed in conjunction with the FIG. 6 embodiment.

In the FIG. 6 embodiment, in step 612, parameter limits may be defined to specify desired ranges for the optimized transformation parameters to perform image data transformation procedures. In step 616, an optimization metric may be defined for evaluating a representative patch set of color patches. Then, in step 620, a current illuminant of the representative patch set may be measured and recorded. Next, in step 624, each of the color patches from the representative patch set may be measured to determine various desired color and brightness characteristics.

In step 628, in accordance with the present invention, the various optimized transformation parameters may be carefully selected to minimize the optimization metric which thereby minimizes noise characteristics in the corresponding image data. In step 632, if optimized transformation parameters remain to be selected for additional illuminants, then the FIG. 6 process may return to step 620 through 632 to repeatedly select additional optimized transformation parameters for each additional illuminant.

Finally, in step 636, when optimized transformation parameters have been selected for each illuminant, then a parameter lookup table 510 may be created for the current camera gain. The FIG. 6 process may then terminate. However, in accordance with the present invention, the FIG. 6 process may typically be repeated for any desired number of camera gains to thereby produce a complete set of parameter lookup tables 510 for utilization by camera device 110 in performing image data transformation procedures. One embodiments for utilizing parameter lookup tables 510 is discussed below in conjunction with FIG. 7.

Figure 7:
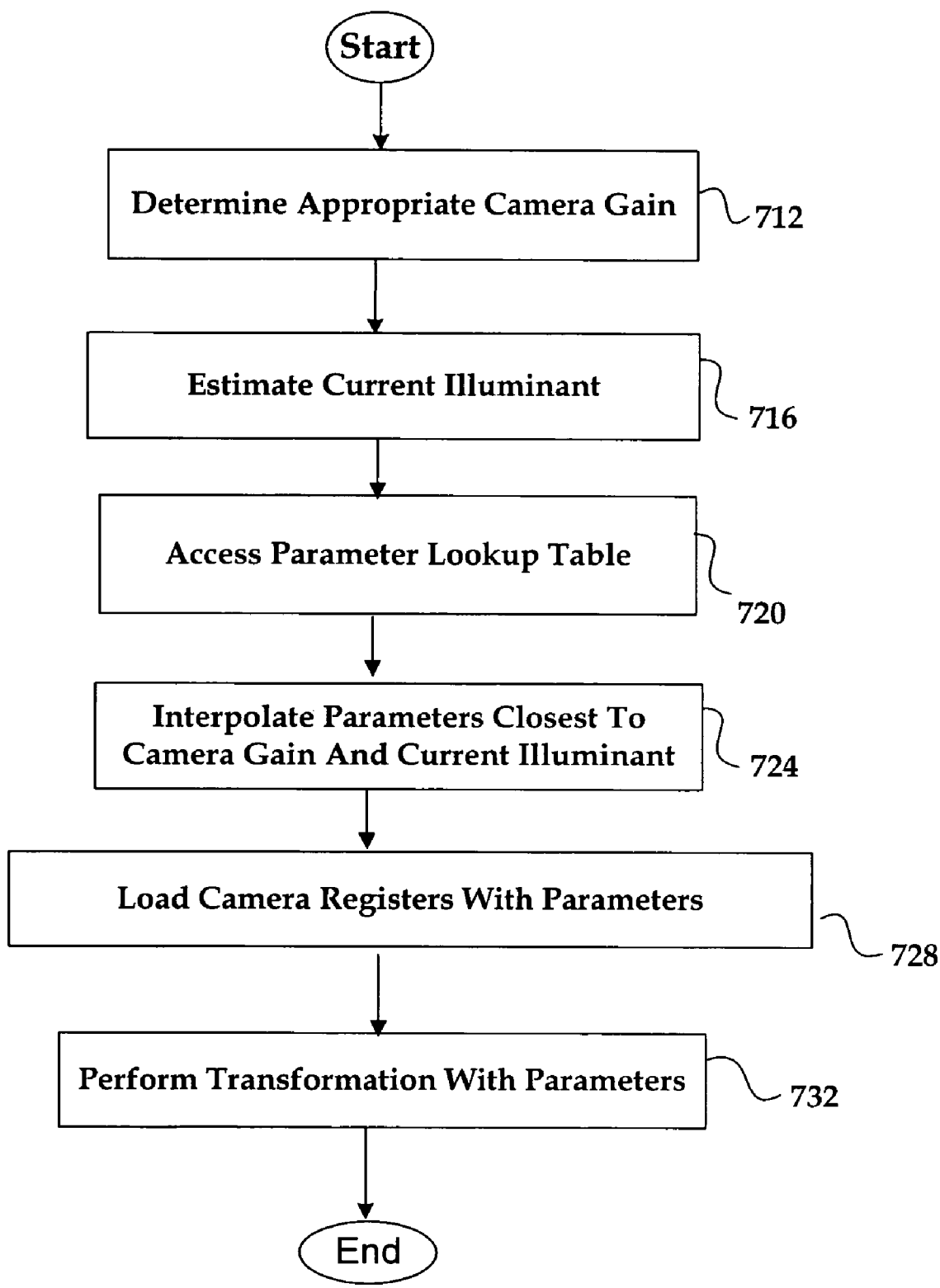
FIG. 7 is a flowchart of method steps for performing an on-line procedure for utilizing optimized transformation parameters, in accordance with one embodiment of the present invention.

Referring now to FIG. 7, a flowchart of method steps for performing an on-line procedure to utilize optimized transformation parameters is shown, in accordance with one embodiment of the present invention. The FIG. 7 embodiment is presented for purposes of illustration, and in alternate embodiments, the present invention may readily utilize various other steps and sequences than those discussed in conjunction with the FIG. 7 embodiment.

In the FIG. 7 embodiment, in step 712, an appropriate camera gain may initially be determined and stored by camera device 110, depending upon current lighting conditions of a desired photographic target. Then, in step 716, camera device 110 may estimate a current illuminant of the photographic target. In step 720, transformation manager 216 of camera device 110 may access one or more parameter lookup tables 510 containing optimized transformation parameters for performing an image data transformation procedure.

In step 724, transformation manager 216 may utilize the parameter lookup tables 510 to interpolate optimized transformation parameters that are closest to the current camera gain and current illuminant of the photographic target. Next, in step 728, transformation manager 216 may load camera registers of camera device 110 with the appropriate optimized transformation parameters obtained in foregoing step 724. Finally, in step 732, transformation manager 216 may utilize the optimized transformation parameters to perform one or more image data transformation procedures, in accordance with the present invention. The FIG. 7 process may then terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for effectively performing an image data transformation procedure, comprising:
   an electronic camera device configured to capture primary image data corresponding to a photographic target; and
   a transformation manager configured to convert said primary image data into secondary image data by utilizing transformation parameters that are optimized to minimize noise characteristics in said secondary image data, said primary image data being in an RGB format that is converted into said secondary image data in a YCbCr format by said transformation manager during said image data transformation procedure, said transformation parameters being optimized by evaluating an optimization metric that is evaluated in a linear L*a*b* color space to minimize said noise characteristics in said secondary image data, standard noise deviations above and below an average L* value being calculated for each color patch from a representative patch set, said standard noise deviations being utilized to calculate noise variance values for each of said color patches according to a formula:

$$NV=(SND)^2$$

where SND is one of said standard noise deviations, and NV is a corresponding one of said noise variance values used to calculate said optimization metric.

2. The system of claim 1 wherein said optimization metric is calculated by taking an average of said noise variance values for each color patch according to a formula:

$$\Phi(\text{gain, illuminant}, k1, k2, k3)=(NV_1+NV_2+NV_3+\ldots NV_M)/M$$

where "M" is a total number of said color patches in said patch set, "NV" is one of said noise variance values, and "Φ(gain, illuminant, k1, k2, k3)" is said optimization metric for particular values of a camera gain, an illuminant, and a selection of said transformation parameters "k1", "k2", and "k3".

3. A system for effectively performing an image data transformation procedure, comprising:
   an electronic camera device configured to capture primary image data corresponding to a photographic target; and
   a transformation manager configured to convert said primary image data into secondary image data by utilizing transformation parameters that are optimized to minimize noise characteristics in said secondary image data, said primary image data being in an RGB format that is converted into said secondary image data in a YCbCr format by said transformation manager during said image data transformation procedure, said transformation manager performing said image data transformation procedure by utilizing said transformation parameters that include a first transformation parameter "k1", a second transformation parameter "k2", and a combination parameter "k3", said transformation parameters being optimized and stored in parameter lookup tables in said camera device for each illuminant at each camera gain, said parameter lookup tables being implemented in a minimized format with a reduced number of said transformation parameters, said transformation manager utilizing interpolation techniques to interpolate additional transformation parameters for certain of said camera gains and said illuminants that are not specifically listed in said parameter lookup tables.

4. A system for effectively performing an image data transformation procedure, comprising:

an electronic camera device configured to capture primary image data corresponding to a photographic target; and a transformation manager configured to convert said primary image data into secondary image data by utilizing transformation parameters that are optimized to minimize noise characteristics in said secondary image data, said primary image data being in an RGB format that is converted into said secondary image data in a YCbCr format by said transformation manager during said image data transformation procedure, said transformation manager performing said image data traffsformation procedure by utilizing said transformation parameters that include a first transformation parameter "k1", a second transformation parameter "k2", and a combination parameter "k3", said transformation parameters being restricted by parameter limits in which said first transformation parameter "k1" is limited according to a first formula: $0 \leq k1 \leq 1$, said second transformation parameter "k2" is limited according to a second formula: $0 \leq k2 \leq 1$, said third transformation parameter (1-k1-k2) is limited according a third formula: $0 \leq (1-k1-k2) \leq 1$, and said combination transformation parameter "k3" is limited according to a fourth formula: $0 \leq k3 \leq 2$.

5. A method for effectively performing an image data transformation procedure, comprising:

capturing primary image data corresponding to a photographic target by utilizing an electronic camera device; and utilizing a transformation manager to convert said primary image data into secondary image data by using transformation parameters that are optimized to minimize noise characteristics in said secondary image data, said primary image data being in an RGB format that is converted into said secondary image data in a YCbCr format by said transformation manager during said image data transformation procedure, said transformation parameters are optimized by evaluating an optimization metric that is evaluated in a linear L*a*b* color space to minimize said noise characteristics in said secondary image data, standard noise deviations above and below an average L* value being calculated for each color patch from a representative patch set, said standard noise deviations being utilized to calculate noise variance values for each of said color patches according to a formula:

$NV = (SND)_2$ where SND is one of said standard noise deviations, and NV is a corresponding one of said noise variance values used to calculate said optimization metric.

6. The method of claim 5 wherein said optimization metric is calculated by taking an average of said noise variance values for each color patch according to a formula:

$$\Phi(gain, illuminant, k1, k2, k3) = \frac{(NV_1 + NV_2 + NV_3 + \ldots}{NV_M}$$

where "M" is a total number of said color patches in said patch set, "NV" is one of said noise variance values, and "$\Phi$(gain, illuminant, k1, k2, k3)" is said optimization metric for particular values of a camera gain, an illuminant, and a selection of said transformation parameters "k1", "k2", and "k3".

7. A method for effectively performing an image data transformation procedure, comprising:

capturing primary image data corresponding to a photographic target by utilizing an electronic camera device; and utilizing a transformation manager to convert said primary image data into secondary image data by using transformation parameters that are optimized to minimize noise characteristics in said secondary image data, said primary image data being in an RGB format that is converted into said secondary image data in a YCbCr format by said transformation manager during said image data transformation procedure, said transformation manager performing said image data transformation procedure by utilizing said transformation parameters that include a first transformation parameter "k1", a second transformation parameter "k2", and a combination parameter "k3", said transformation parameters being optimized and stored in parameter lookup tables in said camera device for each illuminant at each camera gain, said parameter lookup tables being implemented in a minimized format with a reduced number of said transformation parameters, said transformation manager utilizing interpolation techniques to interpolate additional transformation parameters for certain of said camera gains and said illuminants that are not specifically listed in said parameter lookup tables.

8. A method for effectively performing an image data transformation procedure, comprising the steps:

capturing primary image data corresponding to a photographic target by utilizing an electronic camera device; and utilizing a transformation manager to convert said primary image data into secondary image data by using transformation parameters that are optimized to minimize noise characteristics in said secondary image data, said primary image data being in an RGB format that is converted into said secondary image data in a YCbCr format by said transformation manager during said image data transformation procedure, said transformation manager performing said image data transformation procedure by utilizing said transformation parameters that include a first transformation parameter "k1", a second transformation parameter "k2", and a combination parameter "k3", said transformation parameters being restricted by parameter limits in which said first transformation parameter "k1" is limited according to a first formula: $0 \leq k1 \leq 1$, said second transformation parameter "k2" is limited according to a second formula: $0 \leq k2 \leq 1$, said third transformation parameter (1-k1-k2) is limited according a third formula: $0 \leq (1-k1-k2) \leq 1$, and said combination transformation parameter "k3" is limited according to a fourth formula: $0 \leq k3 \leq 2$.

* * * * *